Dec. 17, 1957 S. M. BABBITT 2,816,462
PRECISION BORING MACHINE
Filed April 26, 1956 2 Sheets-Sheet 1

INVENTOR.
Seth M. Babbitt
BY Harold F. Scribner
ATTORNEY

Dec. 17, 1957 S. M. BABBITT 2,816,462
PRECISION BORING MACHINE
Filed April 26, 1956 2 Sheets-Sheet 2
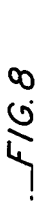
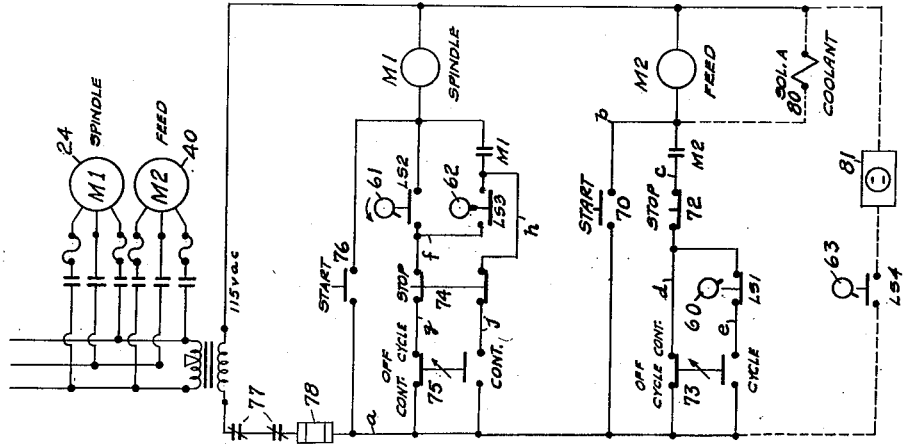
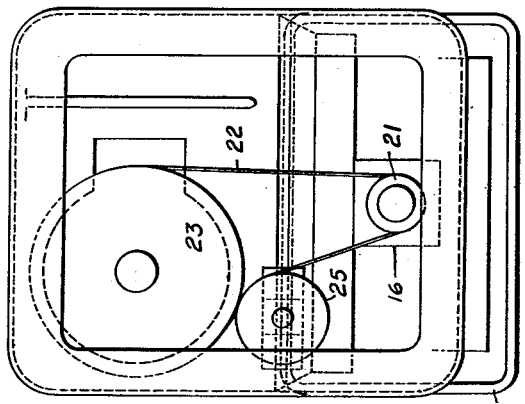
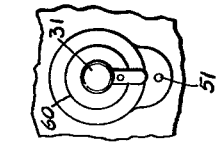
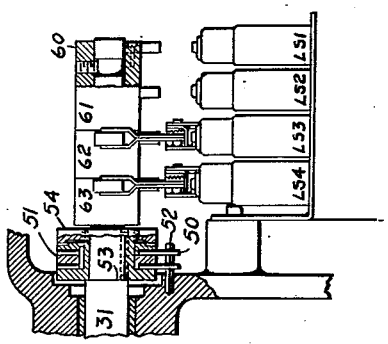
INVENTOR.
Seth M. Babbitt
BY
Harold F. Scribner
ATTORNEY United States Patent Office 2,816,462
Patented Dec. 17, 1957

2,816,462

PRECISION BORING MACHINE

Seth M. Babbitt, Fanwood, N. J., assignor to Massari Brothers Machine Company, Garwood, N. J., a partnership Application April 26, 1956, Serial No. 580,767

5 Claims. (Cl. 77—4)

This invention relates to machine tools and is concerned more particularly with improvements in the design and construction of a boring machine or the like having inherent capacity to perform precision operations on relatively small workpieces at a production rate.

In addition the invention aims to provide a machine structure embodying not only a minimum of parts, but a machine sturdily constructed and arranged to provide a plurality of independently changeable speeds, feeds, and traverse movements to the end of providing a boring machine with new qualities of compactness, sturdiness, and freedom from distortion so that a high degree of accuracy in the performance of a machining operation on one or more or upon a succession of workpieces is attainable in an efficient manner. It is further proposed to construct a boring machine with flexibility and simplicity in the transmission enabling one quickly to change over to any combination of speeds and feeds desired for the work in hand.

Still a further aim of the invention is to produce a precision boring machine of this class in which every effort has been made to eliminate vibration and factors causing vibration, from the machine notwithstanding the need for and the provisions made for obtaining high spindle speeds for one or several spindles.

In attaining the foregoing objectives the invention contemplates a generally square column-type housing adapted to contain the various transmission and motors. The column is suitably cross-ribbed and braced to impart a high degree of rigidity and a minimum tendency toward deflection. The front face of the box-like column is formed with preferably integral forwardly projecting portions at its upper and lower ends, each machined to receive and support one or more laterally adjustable spindles and a vertically movable work-carrier table respectively. The tool spindle, or spindles, may be driven preferably by a single motor mounted on resilient cushions that absorb vibration and which transmits its power to the spindles through the medium of a quiet-running belt. In the instant embodiment the work table is constructed to be cam fed toward and away from the tool spindle. Means have been provided whereby the feed cam may be readily interchanged with another to give the desired work-feed program as well as means in the drive train for effecting an increase or decrease in the rate of machine cycles according to the nature of the tooling operation and the production rate desired.

The invention also includes in combination provision for assuring smoothness in relative movement between tool and work in both directions through the incorporation of means in the feed train for restraining the movable member from driving or tending to drive the cam. In the present transmission a unidirectional plate cam is provided to actuate a follower to move the work toward and away from the tool spindle at rates controlled by the rate of ascent and descent of the work area of the cam, and while this mode of work movement affords the highly desired smoothness in starting and stopping and also in changing from one rate to another there is a tendency of the follower roller to leave the cam, or the cam to leave the follower when the load shifts from the driven to the driving. Accordingly, to prevent erratic action of this character, means have been provided preferably in the form of an artificially-imposed drag applied directly on the cam drive shaft to prevent acceleration and deceleration when the load changes from positive to negative.

The box-like column above refered to also houses a feed motor, likewise resiliently mounted, that drives the cam shaft through double-reduction gear units and an interconnected set of pick-off gears. In the present simplified drive there are but three pairs of tooth contacts for an infinite variety of feed programs and feed rates and which makes for minimum back-lash with consequent improved tooling performance and quality of finish.

The boring machine of this invention further embodies simplified control circuitry by which the motors may be independently controlled, automatically controlled for continuous or cyclic operation and so controlled as to assure completion of a cycle or part of a cycle before the start of another, and with provision made for automatic control of a coolant motor, work index motor, or other accessory equipment if such is desired.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as parts of this disclosure and, in such drawings, like characters of reference denote corresponding parts throughout all the views, of which:

Fig. 1 of the drawings is a front view of a machine tool embodying this invention.

Fig. 4 is a plan view of Fig. 1.

Fig. 5 is a horizontal sectional view illustrating more clearly the construction of the work-table slide and its guide means.

Fig. 6 is an enlarged view of a portion of the main cam shaft with its artificially imposed drag-producing means and also a preferred construction of micro-switch control.

Fig. 7 is an end view of the main cam shaft.

Fig. 8 is a schematic diagram of a preferred control circuit.

Figure 2:
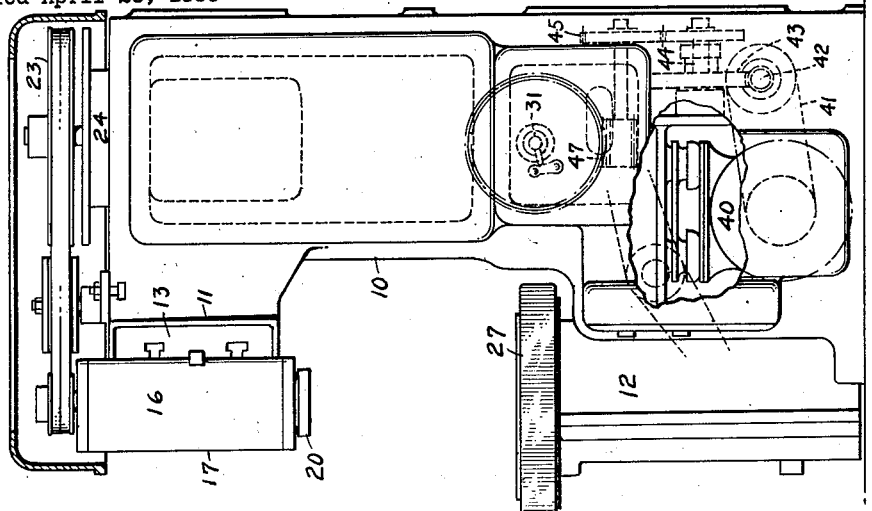
Figs. 2 and 3 are right and left side views respectively of the Fig. 1 machine with portions broken away to illustrate certain construction features.
Figure 1:
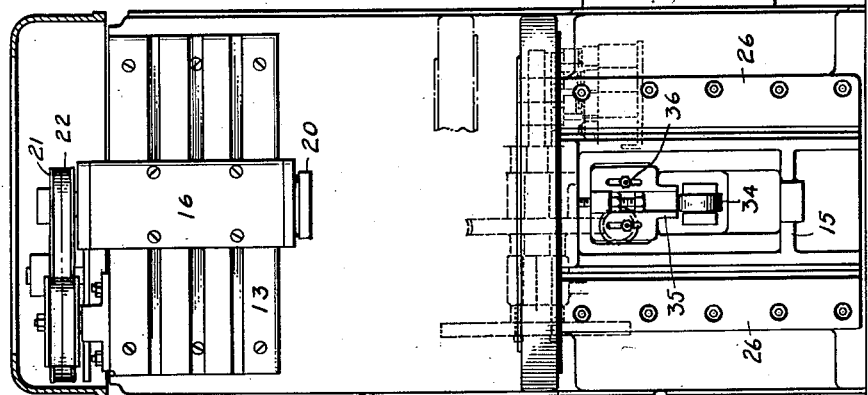
Figure 3:
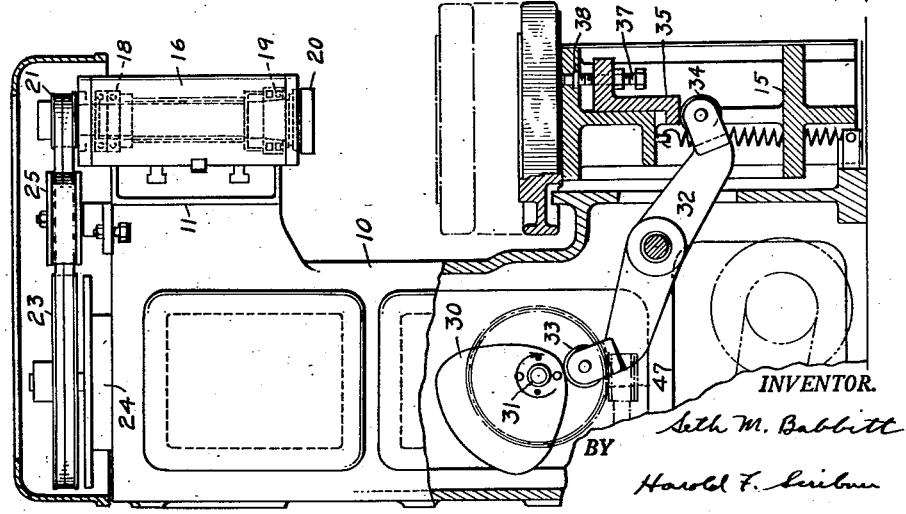

Referring more particularly to Figs. 1-5, the boring machine illustrated comprises a generally rectangular frame or column casting 10 having openings in its sides and top to receive the various components of the drive transmissions. The front of the column projects forward at its upper and lower ends and is machine finished to provide integrally-connected bearing surfaces 11 and 12. The upper surface 11 is adapted to mount a spindle supporting plate 13 and the lower projection 12 is machine finished to provide rectangular guides 14 (see Fig. 5) for a vertically movable work slide 15.

The tool spindle assembly 16, only one shown in the drawings, comprises a solid rectangular block 17 internally bored and recessed at each end for bearings 18 and 19 that journal a rotatable tool spindle 20. The upper end of the spindle carries a drive pulley 21 that is driven by a belt 22 from the pulley 23 on the shaft of a resiliently mounted motor 24. As will be evident from the drawings, the spindle-mounting pad 13 is provided with horizontally extending T-slots by means of which the spindle or spindle assemblies may be laterally adjusted to suit particular work requirements. Proper driving-belt tension is obtained in any spindle position by means of an adjustable idler 25, T-slot mounted to the top of the main frame.

The lower forwardly projecting portion of the main frame is machined preferably with the square guides 14 that are overlaid by straps 26 that contain and accurately guide the table slide 15. The top of the slide 15 is adapted to carry a removable table 27 which preferably is T-slotted across its work area and surrounded by a marginal flange that serves as a collecting basin, with a drain, for such coolants as may be employed in the performance of a tooling operation. As shown most clearly in Figs. 2 and 3, a portion of the work table projects into the gap between the upper and lower projections of the column. However, neither of the column projections is great enough to introduce any serious deflection factor in the column, such as might materially affect the spindle or table alignment.

Vertical movement of the work table is effected by a contoured feed cam 30 removably mounted upon a horizontal master cam shaft 31. A two-armed lever 32 journaled in the main frame carries rollers 33 and 34, the former being positioned to track the cam 30 and the latter to bear against the underside of a thrust plate 35 adjustably secured to the table slide 15. The cam that has been illustrated is purely representative and for a given run of work will be contoured to produce the feed cycle for that work, such as with a relatively steep incline to cause the work that will be mounted in a chuck or the like on the table to approach the tool carried in the spindle, then with a relatively slow incline to cause the work to feed against the tool and to continue feeding for the required tooling depth, then with a concentric portion to provide a dwell period followed by a fast descending portion to effect lowering of the table to starting position, and then with another concentric portion to provide a work change dwell period.

The stroke of the table is determined by the size of the cam 30, and the position of that stroke relative to the spindle, or the boring tool carried thereby may be adjusted to suit conditions by shifting the thrust plate 35 relative to the table slide. For this reason the thrust plate is adapted to be secured to the slide by means of screws 36. The screws may be loosened slightly and the slide relatively adjusted micrometer-like amounts by means of a jack screw 37 that threads through the thrust plate element and abuts against an anvil pin 38 in the overhanging portion of the slide. Depth of boring may be precision determined in this manner without necessarily changing the cam or resetting the boring tool in the spindle.

The cam 30 is driven in this instance by a resiliently mounted motor 40 that drives through belt 41 a worm shaft 42. The latter drives a worm gear 43 on a shaft 44 and pick-off gears 45 transmit the power to another worm shaft 46. From shaft 46 the power is transmitted to the cam shaft 31 through another worm and wormgear reduction 47. The pick-off gears 45, which are accessible at the rear of the machine provide a simple and convenient means for increasing or decreasing the number of feed cycles per unit of time, whereas a change in the pattern of the feed cycle is effected by substituting one cam for another. With such a transmission only three pairs of tooth contacts are involved for any work program and backlash is confined to minimum proportions.

The invention further undertakes to provide a smooth acting table movement in both directions of travel by imposing an artificial drag on the cam shaft 31 operative to restrain the shaft from being driven ahead when the follower roll 33 is riding the descending portion thereof. A preferred form and location of the drag means is illustrated in Fig. 6 and which comprises a series of discs 50 and plates 51, the former being locked against rotation by a stationary pin 52, and the latter being keyed to the shaft 31, and the assembly being compacted against a shoulder 53 on the shaft by means of a nut 54. By adjusting the nut 54, the friction may be increased or decreased at will.

The cam shaft 31 extends beyond the friction discs and carries a series of individually adjustable switch dogs 60–63, arranged to actuate individual limit switches LS1, 2, 3, 4 that control the machine cycle, the control circuits of which are illustrated in Fig. 8.

Referring to Fig. 8, a representative cycle may be instituted by pressing Start button 70 and 115 v. A. C. is fed from line $a$ to line $b$ and the motor contactor coil M2 of the feed motor 40 and the latter starts operating. Simultaneously a holding circuit across the Start button is completed through contacts M2, line $c$, Stop switch 72, line $d$, Cycle switch 73 to line $a$, or via LS1, line $e$, through Cycle switch 73 if set to Cycle, to line $a$.

When the feed motor 31 starts the cam shaft 31 starts to revolve and switch dog 61 thereon closes LS2 and current is supplied to the contactor coil of the spindle motor 24 and the latter starts the spindle revolving. Assuming the switch 73 has been set on Cycle, the switch cam 60 will make a complete turn, corresponding to one complete revolution of the feed cam, and then open the holding circuit of the contactor coil of the feed motor 40 and the latter stops. If the Cycle switch 73 is set on Cont. (continuous) the switch LS1 is shunted and the feed motor runs until the Stop button 72 is pressed to open the holding circuit.

When the switch LS2 of the spindle-motor control-circuit closes, the motor contactor coil is energized and closes contacts M1 in a holding circuit established across normally closed limit switch LS2 to line $f$, across the Stop button of switch 74 to line $g$ and thence across Cycle switch 75 to line $a$. After the cam shaft makes a complete turn the switch cam actuates switch LS3 to its open position and the spindle motor 24 stops. At the stopping position, the switch cam 61 has not quite reached switch LS2 and the latter remains open until the cycle is again instituted by starting the feed motor. If the spindle motor cycle switch 75 has been set to Cont. (continuous) the holding circuit for the coil is made across contacts M1, line $h$, Stop switch 74, line $j$ across the continuous side of switch 75 to line $a$. A pressing of the Stop button of switch 74 will open the holding circuit for the spindle motor and the latter will stop. Likewise a pressing of the Stop button 72 of the feed motor opens its holding circuit and the feed will stop. Jogging of the spindle motor may be effected by turning the spindle-motor cycle switch 74 to Off, whereupon both branches of the holding circuit to the coil are cut out and the motor contactor coil may be energized only by the momentary Start switch 76. To the same effect, a turning of the feed-motor cycle switch 73 to Off, renders the contactor coil responsive only to the momentary Start button 70. To protect the motors a normally-closed overload switch 77 for each motor is connected in the line $a$ and a fuse 78 in the line protects the control circuitry.

If desired the machine may be equipped with a coolant pump and the circuitry therefore may take the form shown in dash lines in Fig. 8 in which 80 represents the coil of a solenoid operated valve. Also an outlet 81 for plugging in an auxiliary motor such as for work indexing, chuck operating, etc. may be installed and cyclically controlled, if desired, by the incorporation of limit switch LS4 and its related cam-shaft-driven actuating cam 63.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A machine of the character described combining a generally rectangular box-like column having integrally-formed forwardly projecting portions at its ends, said projecting portions being spaced apart to provide a work-receiving gap therebetween; a tool-supporting plate mounted to one of said projecting portions, a tool support mounted to said plate, a work support mounted for reciprocatory movement toward and away from said tool support mounted to the other of said projecting portions, said last named projecting portion being provided with guide means adapted to contain complementary guide means provided by the work-support, feed means within the said column for actuating said work-supporting means toward and away from the tool support including a rotatable cam shaft, a contoured plate cam detachably secured thereto, lever means responsive to the contour of said cam and effective on the work support for imparting movement to said work support, means between said lever means and the work support for altering the position of the resulting stroke imparted to the work support relative to the position of the tool support, and means effective on the cam shaft for restraining the movement thereof when the reactionary force developed by the work support changes from positive to negative.

2. A machine of the character described combining a generally rectangular box-like column having integrally-formed forwardly projecting portions at its ends, said projecting portions being spaced apart to provide a work-receiving gap therebetween; a tool-supporting plate mounted to one of said projecting portions, a tool support mounted to said plate, a work support mounted for reciprocatory movement toward and away from said tool support mounted to the other of said projecting portions, feed means within the said column for actuating said work-supporting means toward and away from the said tool support including a rotatable cam shaft, a contoured plate cam detachably secured thereto, lever means responsive to the contour of said cam and effective on the work support for imparting movement to said work support, and means effective on the cam shaft for restraining the movement thereof when the reactionary force developed by the work support as an incident to a change in direction of travel changes from positive to negative.

3. In a machine of the class described the combination of substantially hollow upstanding column, said column having a forwardly protruding bearing pad adjacent its upper end and a forwardly protruding bearing pad adjacent its lower end, a tool spindle mounted to the said upper bearing pad, a relatively movable work holder mounted upon the said lower bearing pad, means for actuating the work holder toward and away from the tool spindle to effect a tooling operation comprising a rotatable cam shaft journaled within the hollow column, a contoured cam mounted on said shaft and operative connections between the cam and the work support operative to actuate the work support upon rotation of said cam shaft, power means within the hollow column for driving said cam shaft including an electric motor and change-gear speed-change means between the motor and cam shaft, said cam being contoured to impart a preselected operating cycle to the work support per revolution of the cam shaft and said change-gear means controlling the frequency of that cycle per unit of time, and means controlling the operating cycle of said power means, and means for imposing an artificial drag on said cam shaft to prevent over-run when the load thereon changes.

4. The combination of claim 3 in which said electric motor is resiliently supported by said hollow column.

5. A boring machine of the character described comprising a generally rectangular box-like column having integrally-formed forwardly projecting portions at its ends, said portions being spaced from each other to provide a gap therebetween to accommodate the work, a tool-spindle assembly including a tool spindle mounted to one of said projecting portions of the column, work-supporting means mounted to the other of said projecting portions, means journaled within the box-like column for moving said tool spindle and work-supporting means rectilinearly relative to one another including a rotatable cam shaft and means actuated by the cam shaft to effect said relative movement, separate means mounted within the box-like column for rotating the tool spindle, and additional means actuated by said cam shaft for controlling the operation thereof and the starting and stopping operations of said separate means for rotating the tool spindle.

References Cited in the file of this patent

UNITED STATES PATENTS

| | | |
|---|---|---|
| 419,071 | Richards | Jan. 7, 1890 |
| 1,679,027 | Gabrielson et al. | July 31, 1928 |